March 25, 1969 G. F. HINTON 3,435,338
LINE INTEGRAL MAGNETOMETER FOR MEASURING
CURRENT FLOW THROUGH AN ELECTROLYTE
Filed Sept. 30, 1965

INVENTOR
GEORGE F. HINTON

BY
ATTORNEY

INVENTOR
GEORGE F. HINTON

BY
ATTORNEY

United States Patent Office 3,435,338
Patented Mar. 25, 1969

3,435,338
LINE INTEGRAL MAGNETOMETER FOR MEASURING CURRENT FLOW THROUGH AN ELECTROLYTE
George F. Hinton, Severna Park, Md., assignor to the United States of America as represented by the Secretary of the Navy
Filed Sept. 30, 1965, Ser. No. 491,846
Int. Cl. G01r 33/02
U.S. Cl. 324—43          4 Claims

ABSTRACT OF THE DISCLOSURE

An instrument for measuring small currents in electrolytes. The device includes an electrically conductive core, a toroid of magnetically permeable material encircling the core to be saturated by the magnetic field produced by current flow through the core, a magnetic field responsive means coupled to the toroid, and magnetic shielding means surrounding the core, toroid and responsive means. The shielding means is in electrical contact with opposed ends of the core to permit current to flow through the core when the instrument is placed in an electrolyte.

---

The invention described herein may be manufactured and used by or for the Government of the United States of America for governmental purposes without the payment of any royalties thereon or therefor.

The present invention relates to a device for measuring the density and direction of current flow through an electrolyte and more particularly to a device suitable for measuring the density and direction of very small currents flowing through an electrolyte, i.e., the natural telluric currents flowing through sea water.

Heretofore, many problems have been encountered in attempting to measure the density and direction of small currents flowing through an electrolyte. For instance, the conventional prior art method of measuring natural telluric currents in sea water has been to immerse two electrodes therein and measure the potential difference between them using a high input impedance amplifier. This method is not altogether satisfactory because the electrodes must be connected by long cables and the measured potential difference contains errors due to the electrical properties of the electrodes themselves and to the changing character of the environment.

The general purpose of this invention is to provide a device which is suitable for measuring the density and direction of small currents flowing through an electrolyte but which possesses none of the disadvantages of the prior art. To obtain this, the present invention contemplates placing an electrically conductive core in the electrolyte whereby a current flowing in the electrolyte will flow through the conductive core, encircling the core with a toroid composed of a highly permeable magnetic material in such a manner that the toroid is disposed in and saturated by the magnetic field produced by current flow through the core, and coupling a magnetic field responsive device to the toroid to obtain an output voltage proportional to the field and, hence, to the current flowing through the core. The present invention also contemplates enclosing the core, toroid, and magnetic field responsive means in a magnetic shield to prevent measurement errors due to ambient magnetic fields saturating the toroid. This arrangement provides a device which avoids the introduction of stray potentials which caused erroneous readings in prior art devices of this type.

The theoretical basis for the present invention is Ampere's law which states that the line integral of the magnetic field intensity around a closed path is equal to the current enclosed by that path. Thus, the present invention is referred to as a line integral magnetometer.

An object of the present invention is the provision of a device for measuring the density and direction of current flow through an electrolyte.

Another object is to provide a relatively compact, inexpensive, and simple device suitable for measuring the density and direction of small currents flowing through an electrolyte.

A further object of the invention is the provision of a device employing the principle that the line integral of the mangetic field intensity around a closed path is equal to the current enclosed by that path to obtain a measurement of the density and direction of current flow through an electrolyte.

Still another object is to provide a relatively compact, accurate, inexpensive, sensitive, and simple device for measuring the density and direction of current flow through an electrolyte by employing the principle that the line integral of the magnetic field intensity around a closed path is equal to the current enclosed by that path.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

As used herein the phrase "highly permeable magnetic material" refers to a material having a permeability at least as large as the permeability of the least permeable material classified among the "High-permeability Materials" in the Handbook of Chemistry and Physics, 39th edition, Chemical Rubber Publishing Co., p. 2437.

Figure 1:
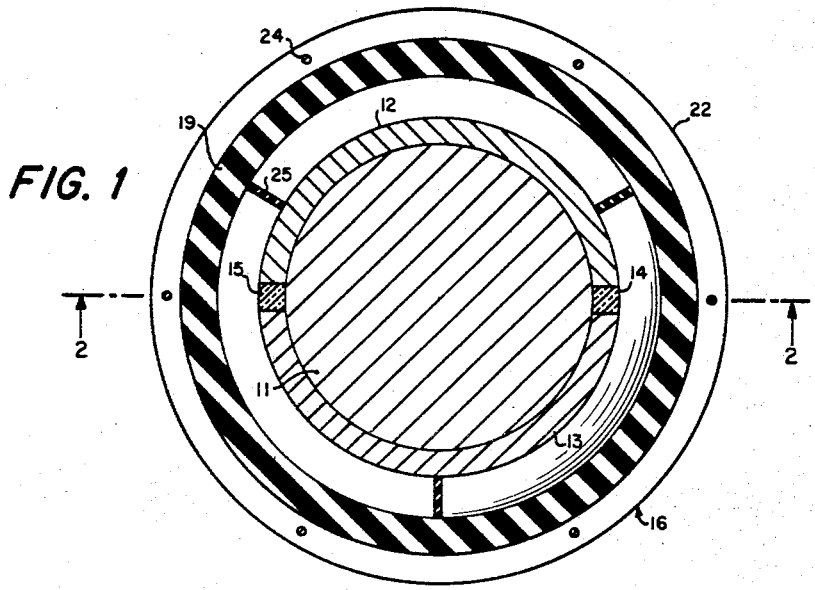
FIG. 1 shows a cross-section of an embodiment of the present invention wherein the magnetic field responsive means are Hall-effect devices.
Figure 2:
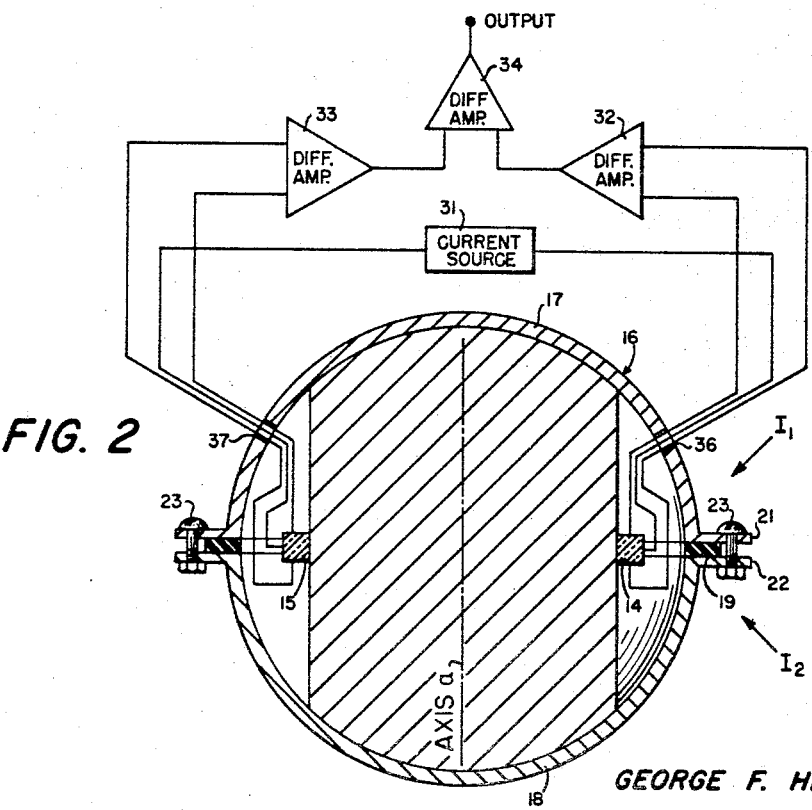
FIG. 2 is a cross-section of the embodiment of FIG. 1 taken on the lines 2—2 of FIG. 1 looking in the direction of the arrows with the external circuitry applied.

Turning now to FIGS. 1 and 2 wherein a first embodiment of the invention is shown. Conductive core 11, which is composed of a highly electrically conductive material, such as copper, is encircled by a toroid having two parts 12 and 13 composed of a highly permeable magnetic material, preferably a material such as Permalloy or mu-metal, which has an extremely high permeability. Hall-effect devices 14 and 15 are respectively disposed in gaps on opposed sides of core 11.

Core 11, the toroid 12–13, and Hall-effect elements 14 and 15 are enclosed by a spherical magnetic shield indicated generally as 16 and which is formed by two hemispherical sections, 17 and 18, of highly permeable magnetic material, separated by an annular electrical insulator 19 as more clearly illustrated in FIG. 2. Sections 17 and 18 have similar respective annular flanges 21 and 22 which are secured together with insulator 19 disposed therebetween by bolts 23. Bolts 23 are composed of non-conductive material and disposed in aligned holes 24 which are located at intervals around flanges 21 and 22. When the present invention is to be used in water, shield 16 is made water-tight. The first and second parts, 17 and 18 respectively, of the shield 16 make electrical contact with opposed ends of core 11. Spacers 25, of insulating material and of suitable size and configuration, support and maintain, either by press fit or bonding, the toroid 12–13 and core 11 in position.

In operation the magnetic shield 16 and enclosed core 11, toroid 12–13, and Hall-effect elements 14 and 15 are placed in the electrolyte. Current source 31 and differential amplifiers 32, 33 and 34 are preferably located at a position remote from the electrolyte and are connected to the Hall-effect elements 14 and 15 by leads passing through sealed (not shown) openings 36 and 37 in shield 16.

In a typical instance, when the line integral magnetometer is placed in the electrolyte in such a manner that the current flow through the electrolyte is away from the first part 17 of shield 16 toward the second part 18, as is illustrated by I, by way of example, current will flow into the conductive core 11 through the first part 17 of shield 16 and out of core 11 through the second part 18. Insulator 19 breaks the conductive path through the shield 16. Conversely, if the direction of current flow is as indicated by $I_2$, the current through the magnetometer will be from section 18 through core 11 and out of section 17. In either event, the current flowing through core 11 will create a magnetic field thereabout.

As to the essentiality of core 11 to the invention, if core 11 were omitted, toroid 12–13 would nonetheless enclose some of the current flowing through the electrolyte. However, if this current were very small, such as the natural telluric currents flowing in sea water, the magnetic field produced by the current enclosed by the toroid would not be sufficient to saturate the toroid. Thus, core 11, which as aforementioned is composed of a highly conductive material, is essential in order to enhance the current flow so as to saturate the toroid thereby making the present invention sensitive enough to measure even the small natural telluric currents in sea water.

The toroid encircles core 11 in a plane which is transverse to the longitudinal axis $a$ of the core 11 and is disposed in and saturated by the magnetic field produced by current flow through core 11. This magnetic field is enhanced by the highly permeable magnetic material of which the parts 12 and 13 of the toroid are composed and, hence, Hall-effect elements 14 and 15 are subjected to this enhanced magnetic field.

Current source 31, which may supply either A.C. or D.C. current, is connected in a series circuit with Hall-effect elements 14 and 15 and causes substantially identical currents to flow through elements 14 and 15 in a direction perpendicular to the magnetic field whereby a potential gradient exists across each of Hall-effect elements 14 and 15. This potential gradient exists in a direction perpendicular to both the direction of the magnetic field and the direction of current flow through elements 14 and 15.

The outputs of differential amplifiers 32 and 33 are equal to the potential gradients across Hall-effect elements 14 and 15, respectively, and the output of differential amplifier 34 is equal to the difference between the potential gradients across Hall-effect elements 14 and 15. Hence, the magnitude of the output of amplifier 34 is proportional to the density of current flow through the electrolyte and the polarity of the output of amplifier 34 indicates the direction of current flow through the electrolyte.

The magnetic shield 16 prevents the toroid from becoming saturated by ambient magnetic fields. This eliminates a possible source of error in the measurements of the current flow through the electrolyte.

Figure 3:
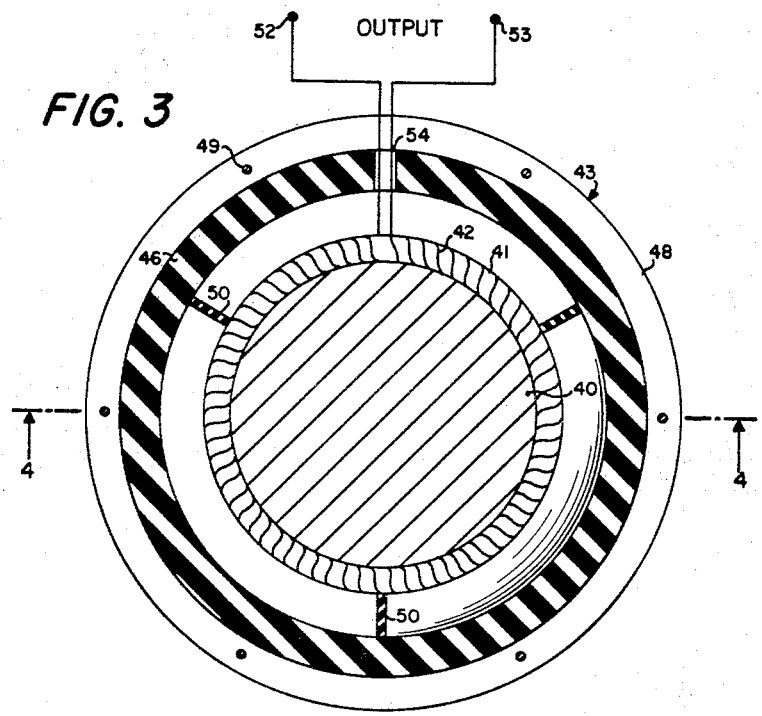
FIG. 3 shows, partly in cross-section, a second embodiment of the present invention wherein the magnetic field responsive means is a coil wound on the toroid.
Figure 4:
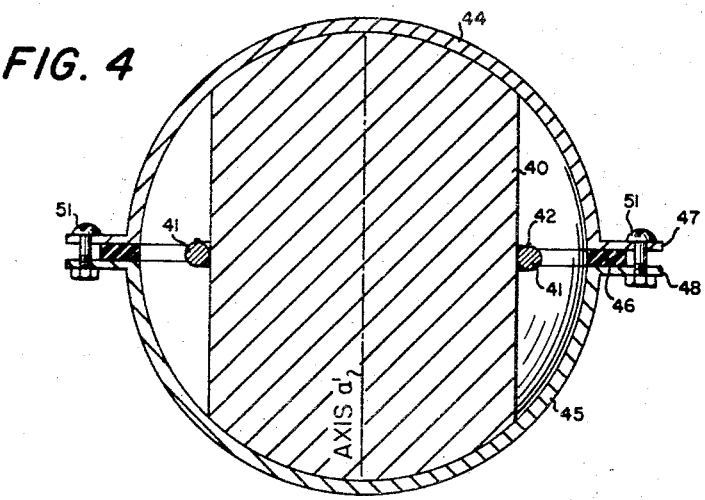
FIG. 4 is a cross-section of the embodiment shown in FIG. 3 taken on the line 4—4 of FIG. 3 looking in the direction of the arrows.

A second embodiment of the invention is shown in FIGS. 3 and 4. Conductive core 40 is encircled by a toroid 41 upon which is wound a coil 42. The core 40, toroid 41, and coil 42, are enclosed by a spherical magnetic shield 43 having a first hemispherical part 44, second hemispherical part 45, and annular insulator 46 disposed therebetween. Annular flanges 47 and 48 of the first and second parts, 44 and 45 respectively, have aligned holes 49 spaced at intervals thereon. The first and second parts, 44 and 45 respectively, of the shield 43 are secured together with insulator 46 disposed therebetween by bolts 51 which are composed of nonconductive material and placed through aligned holes 49. If the line integral magnetometer is to be used in water, the shield 43 is to be made water-tight. Toroid 41 and encircled core 40 are held in position by spacers 50.

In operation, the shield 43 and enclosed toroid 41 and coil 42 are disposed in the electrolyte. Output terminals 52 and 53 are coupled to coil 42 by leads passing through sealed (not shown) opening 54 in shield 43 and are preferably located at a position remote from the electrolyte.

If it is assumed that the line integral magnetometer is disposed in the electrolyte so that current flowing through the electrolyte flows away from the first part 44 towards the second part 45 of shield 43, current will flow into core 40 through the first part 44 and out of core 40 through the second part 45 of shield 43. Insulator 46 breaks the current path through shield 43. Core 40 provides the necessary sensitivity to permit the use of the embodiment shown in FIGS. 3 and 4 to measure small currents.

Since toroid 41 is disposed transverse to the longitudinal axis $a'$ of core 40 and in the magnetic field produced by current flow through core 40, time-varying currents flowing through core 40 saturate toroid 41 and cause a proportional voltage to be induced in coil 42. This voltage appears across output terminals 52 and 53 in a direction representative of the direction of the current flow through the electrolyte and of a magnitude correlative to the density thereof.

The magnetic shield 43 prevents the highly permeable toroid from becoming saturated by ambient magnetic fields. This eliminates a source of possible error affecting the proportionality of the voltage appearing across terminals 52 and 53 to the current flowing through core 40. Also, shield 43 prevents gradients in ambient alternating magnetic fields from inducing voltages in the winding and, further, prevents homogeneous ambient alternating magnetic fields from inducing voltages in coils that are not perfectly constructed.

One important limitation affecting the embodiment shown in FIGS. 3 and 4 is that the embodiment will respond only to time-varying current flowing through core 40 since coil 42 is in effect a secondary winding. The embodiment shown in FIGS. 1 and 2 does not suffer from this limitation.

It should now be clear that the present invention provides a relatively compact, inexpensive, accurate, and simple line integral magnetometer sufficiently sensitive to measure the density and direction of current flow through an electrolyte and, yet sufficiently insensitive to external sources of error.

What is claimed and desired to be secured by Letters Patent of the United States is:

1. A line integral magnetometer for measuring the density and direction of current flow through an electrolyte comprising:

an electrically conductive core having first and second opposed ends adapted to make electrical contact with said electrolyte and a longitudinal axis extending between said ends whereby, upon passage of current through said core, a magnetic field as created;

a toroid composed of a highly permeable magnetic material encircling said core and being disposed in a plane which is transverse to said axis;

magnetic field responsive means coupled to said toroid;

a magnetic shield enclosing said core, said toroid and said magnetic field responsive means;

said shield being defined by first and second parts of highly permeable magnetic material with an electrical insulating member disposed therebetween;

said first and second parts making electrical contact with said first and second ends respectively.

2. A line integral magnetometer according to claim 1 wherein:
said toroid has a first gap on one side of said core and a second gap on the opposite side of said core; and wherein said magnetic field responsive means comprise a Hall-effect element disposed in each of said gaps.

3. A line integral magnetometer according to claim 2 further including:
means connected to each of said elements for passing substantially identical currents through each of said elements in a direction perpendicular to the direction of said magnetic field at the location of said elements therein; and
means connected to said elements for obtaining a voltage equal to the difference between the voltage gradients across said elements in a direction perpendicular to both the direction of current flow therethrough and said direction of said magnetic field.

4. A line integral magnetometer according to claim 1 wherein said magnetic field responsive means comprises: a coil wound on said toroid.

References Cited
UNITED STATES PATENTS

| | | | |
|---|---|---|---|
| 2,297,568 | 9/1942 | Leonardon | 324—47 |
| 2,802,182 | 8/1957 | Godshalk et al. | 324—29 |
| 2,886,779 | 5/1959 | Kuhrt et al. | 324—127 |

RUDOLPH V. ROLINEC, *Primary Examiner.*

R. J. CORCORAN, *Assistant Examiner.*

U.S. Cl. X.R.

324—7, 8, 29, 30, 117